United States Patent [19]

Eiermann et al.

[11] 4,412,449
[45] Nov. 1, 1983

[54] APPARATUS FOR MEASURING THE FLOW VELOCITIES OF GASES AND LIQUIDS

[75] Inventors: Kurt Eiermann, Pfungstadt; Wolfgang Schafer, Frankfurt, both of Fed. Rep. of Germany

[73] Assignee: Degussa Aktiengesellschaft, Frankfurt am Main, Fed. Rep. of Germany

[21] Appl. No.: 242,405

[22] Filed: Mar. 10, 1981

[30] Foreign Application Priority Data

Mar. 12, 1980 [DE] Fed. Rep. of Germany ....... 3009382

[51] Int. Cl.³ .............................................. G01F 1/68
[52] U.S. Cl. ....................................... 73/204; 73/118
[58] Field of Search .......................... 73/204, 118, 198

[56] References Cited

U.S. PATENT DOCUMENTS 3,433,069 3/1969 Trageser ................................ 73/204
4,280,360 7/1981 Kobayashi et al. .................... 73/198

FOREIGN PATENT DOCUMENTS 1245138 9/1971 United Kingdom ................. 73/204
2025062 1/1980 United Kingdom ................. 73/204

*Primary Examiner*—Herbert Goldstein
*Attorney, Agent, or Firm*—Cushman, Darby & Cushman

[57] ABSTRACT

An apparatus for the measurement of the flow velocity of gases and liquids, particularly the intake air of combustion engines, includes one or more temperature dependent at least partially heated resistances disposed behind a protective shield which produces a turbulent flow which flow is rendered laminar by interposing a honeycomb of wire screen between the protective shield and the resistance element.

4 Claims, 4 Drawing Figures

4,412,449

APPARATUS FOR MEASURING THE FLOW VELOCITIES OF GASES AND LIQUIDS

BACKGROUND OF THE INVENTION

The invention is directed to an apparatus for the measurement of the flow velocity of gases and liquids especially for the measurement of the intake air of combustion motors, having one or more temperature dependent resistances, of which one or more are heated, whereby the heated resistance or resistances are arranged behind a protective shield, referring to the direction of flow.

In the interest of maintaining the purity of the air it is necessary to reduce the pollutants produced by combustion engines, especially automobiles. This goal is attained among others by an improvement of the course of combustion. For this purpose it is necessary that the most exact information be available in each case in regard to the amounts of intake air, namely, with the smallest possible delay in time.

Hot wire anemometers of various construction have already been proposed for the measurement of the amount of intake air of combustion engines. The decisive disadvantage of customary hot wire anemometers is that the particles of dirt entrained in the intake air deposit on the heated resistance and through this change the measured characteristic of the heat emission. In order to prevent this it has been proposed to use as heated resistance a metal film resistance on a supporting plate and to so arrange this that the deposit of dust does not take place on the heat transmitting surface.

On the one hand this can be strived for by making the surface turned to the flow as small as possible compared to the heat transmitting surface.

Further possibilities are to thermally insulate the surface of the heated resistance turned to the flow or arrange the heated resistance behind a protective shield. The procedures mentioned, however, cause an instability of the flowing around the heated resistance which lead to fluctuations of the heat transmission and therewith the measured signal.

It has furthermore been proposed to arrange a flow barrier before the heated resistance which should lead to a stabile turbulent flow around the heated resistance. Provided that the flow barrier is suited to prevent the deposit of dirt on the heated resistance to the required extent it is not possible to obtain a sufficient stability of the turbulent flow behind this flow barrier. It turns out that the development of the flow behind the flow barrier to a considerable measure is dependent on the degree of turbulence of the flow before the barrier so that there results a severe dependence of the signal measured on disturbances at the air inlet.

Therefore, it was the problem of the present invention to devise an apparatus for the measurement of flow velocity of gases and liquids, especially the intake air of combustion engines, with one or more temperature dependent resistances, of which one or more are heated whereby the heated resistance or resistances are arranged behind a protective shield, referring to the direction of flow. This apparatus should have a stabile measured characteristic and be independent of disturbances at the air inlet in its output signal.

SUMMARY OF THE INVENTION

This problem was solved according to the invention by arranging between the protective shield and the heated resistance a structural element for the production of a laminar flow.

By quieting the flow behind the protective shield there is obtained a stabile flow condition at the place of the heated resistance so that the measured signal obtained is sufficiently independent of the degree of turbulence of the intake air before the protective shield and thus also independent of disturbances at the air inlet.

DETAILED DESCRIPTION

Figure 1:
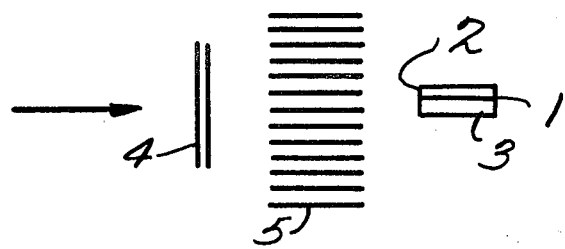
FIG. 1 shows schematically an illustrative form of the invention.

Referring to FIG. 1 of the drawings the heated resistance 1 consisting of a metal film 2 having a high temperature coefficient on an electrically insulating supporting plate 3 is in known manner a constituent of an electronic regulating device so that the heating current is a measure for the heat transmitted to the air flow.

There is arranged referring to the direction of flow before the heated resistance a protective shield 4 and a honeycomb 5. This honeycomb serves in known manner as laminator. The honeycomb 5 can be composed of tubes of the same or different diameters.

It is possible to use as protective shield 4 either solid bodies with different cross sections or a suitable, fine wire screen.

The laminator preferably can consist of a honeycomb 5 or one or more suitable wire screens 7 or a combination of both of these.

Figure 2:
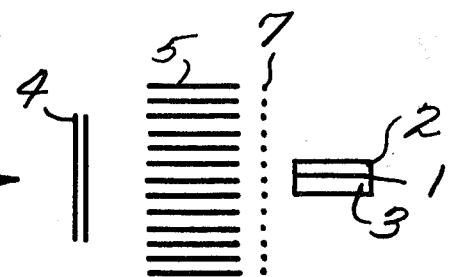
FIG. 2 shows another illustrative form of the invention.

FIG. 2 illustrates a form of the invention in which the laminator consists of a combination of honeycomb 5 and wire lattice or screen 7.

Figure 3:
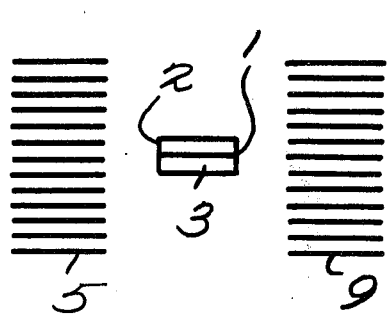
FIG. 3 illustrates another form of the invention.

FIG. 3 shows an apparatus according to the invention wherein there is arranged referring to the direction of flow both before and after the heated resistance 1 a honeycomb (5 and 9) as laminator (laminated flow producers). These laminators can also consist of a combination of honeycomb 5 and wire screen. The laminator (i.e., laminar flow producer) behind the heated resistance has the advantage of suppressing engine caused disturbances of the flow.

Figure 4:
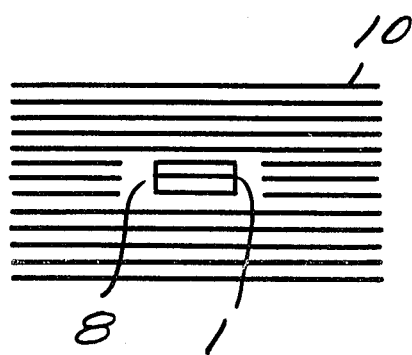
FIG. 4 shows an especially preferred form of the invention.

FIG. 4 illustrates an especially advantageous form of the invention in which the heated resistance 1 is arranged in recess 8 of the connecting honeycomb 10 which serves as the laminator.

It is possible to use any described combination of the arrangements set forth. Furthermore it can be advantageous to arrange the entire layout consisting of protective shield, laminator and heated resistance inside a tube which is formed on the inlet side and, in a given case, also on the outlet side as a nozzle, especially a Venturi nozzle.

It is also possible to use wires as the heated resistance.

The device of the invention can comprise, consist essentially of, or consist of the stated elements.

What is claimed is:

1. In an apparatus for measuring the flow velocity of gases and liquids, especially the intake air of combustion engines, having at least one temperature dependent resistance and where at least one of the resistances is heated, wherein the heated resistance is disposed downstream from a protective shield means, the improvement comprising, positioned between the protective shield means and the heated resistance, means for producing a laminar flow, and means for producing laminar flow positioned behind the heated resistance, said means for producing a laminar flow before and after the heated resistance comprising connecting honeycombs having a hollow space therein and wherein said resistance is positioned in said hollow space.

2. An apparatus according to claim 1 wherein the protective shield is a solid body.

3. An apparatus according to claim 1 wherein the temperature dependent resistance comprises a thin metal layer on an electrically insulating support.

4. An apparatus according to claim 1 wherein the protective shield is a wire screen.

* * * * *